3,481,368
FLEXIBLE REINFORCED HOSE
Robert H. Vansickle, Stow, and Oren R. Linger and James A. Janshego, Marion, Ohio, assignors to The B. F. Goodrich Company, New York, N.Y., a corporation of New York
Filed Apr. 18, 1966, Ser. No. 543,389
Int. Cl. F16l 11/08, 11/12
U.S. Cl. 138—125
5 Claims

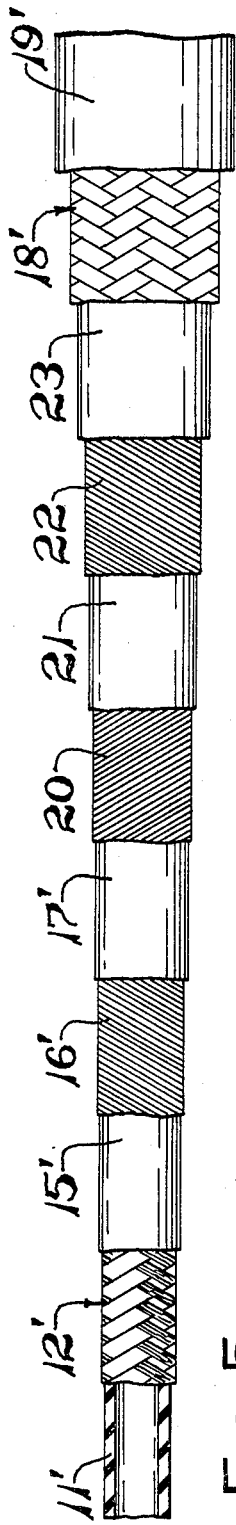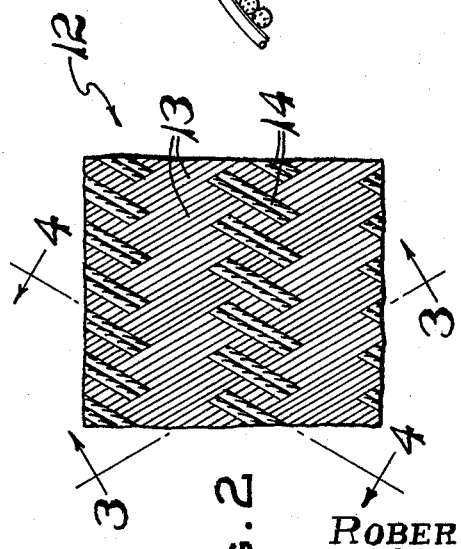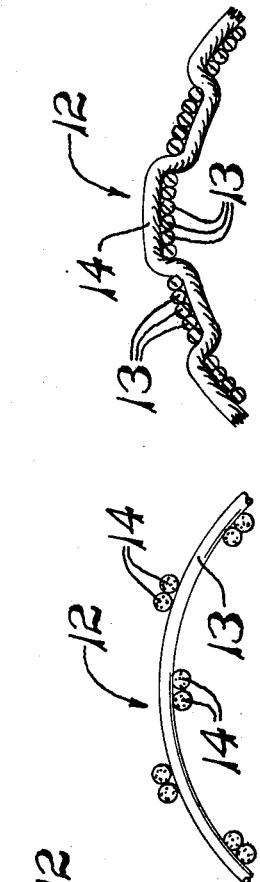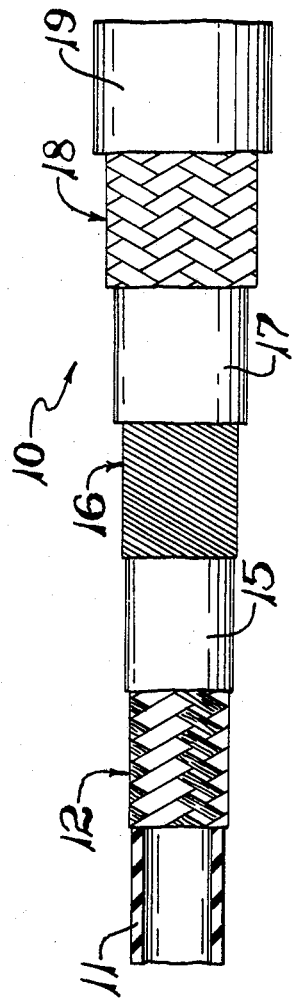

ABSTRACT OF THE DISCLOSURE

A flexible hose comprising an elastomer liner tube surrounded by a plurality of layers of metallic wire reinforcement and an external cover, the inner reinforcing layer comprising a single thickness of helically wound wires interlaced by textile yarns with the wires lying in a smooth cylindrical configuration and all interlacing crimp being in the textile yarns. One or more additional reinforcing layers of wire are wound helically without interlacing textile yarns and with an insulating layer of elastomer between each layer of reinforcement. A layer of braided wire may be provided over the other reinforcing layers and beneath the cover.

---

This invention relates to an improved flexible hose for containing and conveying fluids under high pressure and, more particularly, to an improved hose construction comprising an elastomer liner tube surrounded by metallic wire reinforcements.

Hose which is required to remain substantially unchanged in dimensions while containing or conveying liquid under high pressure is conventionally constructed with a liner tube of elastomer reinforced by one or more surrounding layers of braided filaments which are generally formed of high tensile metal. However, as disclosed in U.S. Patent 2,829,671, braiding of high tensile wires by interlacing two courses thereof causes the wires in each of the courses to be crimped as they cross each other. This not only reduces the flexibility of the resulting hose but also lessens its resistance to damage by repeated flexures of the type which occur when the liquid in the hose is subjected to pulsating pressure. In order to overcome this defect, Patent 2,829,671 proposed that the reinforcements be formed by braiding the high tensile wires with textile webs in a manner such that all of the crimp occurs in the latter. However, that patent emphasizes that there must be at least two such braided layers and any additional reinforcements should be provided by similar pairs of metallic-textile braided layers or by a layer of conventional all metallic braid.

Applicants have now discovered that a high pressure hose can be produced with greater flexibility without loss of dimensional stability or adequate burst strength by providing the reinforcing layers in the form of a single helical course of wire interlaced with a layer of textile yarns and surrounded by one or more helical couress of wire without interlacing with textile yarns, the several helical courses of wire extending alternately in opposite directions. The improved hose may be provided with a protective covering of elastomer, either with or without reinforcing fibers, and a layer of braided wire may also be provided between the cover and the radially outer of the helical courses of reinforcement.

The nature and advantages of the invention will hereinafter be more fully apparent from the following detailed description of the presently preferred embodiment, and modifications thereof, described with reference to the accompanying drawings, forming a part of this application, and in which:

FIG. 1 is a side elevational view of the presently preferred embodiment of hose incorporating this invention with the inner liner tube in section and the successive layers broken away at different locations to illustrate the internal construction;

FIG. 2 is an enlarged plan view of a segment of the radially innermost reinforcing layer shown in FIG. 1;

FIG. 3 is a cross-sectional view of the layer shown in FIG. 2, the view being taken on the section indicating line 3—3;

FIG. 4 is a sectional view of the reinforcing layer illustrated in FIG. 2, the view being taken on the line 4—4 of FIG. 2; and FIG. 5 is a view similar to FIG. 1 showing another embodiment of the invention.

Referring first to FIG. 1, the hose 10 comprises an inner liner tube 11 formed of suitable elastomeric material, such as rubber or organic plastic material, which is preferably formed by extrusion. This tube, in uncured condition, is then covered by a first reinforcing layer 12 formed by helically winding one or more courses of high tensile metal wire 13 about the tube and interlacing the wire, during the winding, with one or more courses of textile yarns 14. This interlacing is in the form of an interweaving or braiding operation such that the wires 13 lie in a smooth cylindrical configuration without crimps as is apparent in FIG. 3 while all of the crimps are formed in the textile yarns 14. Hence, the wires have no corners or kinks and, therefore, do not tend to penetrate the wall of the elastomeric liner tube 11 either during the forming operation, while the said liner tube is in uncured condition, nor subsequently thereto during use of the hose at which time the tube is in vulcanized condition.

The first or radially innermost reinforcing layer 12 is covered by an insulating or separating layer 15 of elastomer by suitably applying the elastomer in plastic condition to the outer surface of the reinforcing layer 12. This may, for example, be effected by applying over the reinforcing layer 12 a strip of uncured elastomer, either with or without the application of an elastomer cement between the layers 12 and 15. A second reinforcing layer 16 is provided over the insulating or separating layer 15. The reinforcing layer 16 is formed of high tensile metal wires helically wrapped in side-by-side relationship and in a direction reverse to the wires 13 in the layer 12. In this second reinforcing layer the wires are not interlaced by textile yarns.

A hose construction as just described may be employed without further reinforcements by providing a suitable protective covering over the reinforcing layer 16 and then vulcanizing the elastomeric materials so that the several layers are integrally united. Preferably, however, the second reinforcing layer 16 is covered with an insulating or separating layer of elastomer 17 which is similar to the layer 15 and applied in the manner. A reinforcing layer 18 of metallic wire is then braided over the layer 17 and this, in turn, is covered by a jacket or outer cover 19 of suitable elastomeric material which is applied in uncured condition. Thereafter, the completed hose assembly is vulcanized whereupon the several layers of elastomer are firmly bonded with the reinforcing layers so that the entire structure becomes an integral, flexible conduit. The hose thus constructed may be employed with fittings of known type which permits the hose to be readily placed in communication with liquids under pressure for containing and/or conveying the latter.

A hose of the construction just described is less expensive to manufacture than prior reinforced hose employing entirely braided reinforcements. This is due to the fact that such hose is less subject to damage to the liner tube during manufacture and, nevertheless, can be manufactured at a faster rate. These improvements are, in part, the result of complete omission of interlacing from one or more of the reinforcing layers and, in part, the result of the interlocking action of the textile yarns in the inner or first reinforcing layer being effected without any crimping of the wires. This latter feature prevents the wires from cutting through the soft uncured rubber liner tube during formation of the hose while at the same time contributing to the aforementioned increased speed of manufacture. Furthermore, the improved hose construction exhibits greater flexibility for equal strength than prior constructions, this being attributed to the absence of interlacing elements in one or more of the reinforcing layers of helically wound wire.

The materials employed in constructing the hose will, of course, be selected in accordance with the size of the hose desired, the nature of the liquids to be handled, and the pressures to which it will be subjected. By way of example and without limitation thereto, it may be mentioned that one suitable construction comprises a liner tube with an inside diameter of $3/8$ inch and an outside diameter of $27/32$ inch formed of a neoprene rubber compound containing suitable curing additives, processing aids, and other ingredients well-known in the art of elastomer compounding. The wires employed in the radially inner or first reinforcing layer were cold drawn carbon steel in monofilament form having a diameter in the order of .013 inch with a minimum tensile strength of 350,000 p.s.i. and capable of being wrapped around a mandrel four times the nominal diameter of the wire without fracture of the latter. This wire was provided with a liquor finish (i.e. a light coating formed by a dip in a solution containing copper sulfate) to facilitate adhesion to the elastomer. The textile yarns, interlaced with the wires in the inner or first reinforcing layer, were rayon having a gauge of .012 inch with a tensile strength of 12 pounds and a twist of three turns per inch in the Z direction. The wires and textile yarns were preferably disposed in a basket weave formed, two over and two under, by twelve plaits of rayon, two strands per plait, interlacing twelve plaits of steel wire, alternating five and six filaments per plait. The second reinforcing layer 16 and the braided reinforcing layer 18 employed wire monofilaments identical with those in the first reinforcing layer 12.

The protective cover 19 was a neoprene rubber compound provided with the usual curing agents, accelerators and other ingredients customarily employed for the outer surface of a hose that is resistant to hydrocarbons. The insulating layers of elastomer 15 and 17 were also formed of a neoprene compound containing the usual curing agents, accelerators and other ingredients well known in the rubber compounding art.

Although the invention has heretofore been described in detail with respect to a specific embodiment in which a single layer of helically wound metal wires is provided over the inner reinforcing layer of textile yarns interlaced with helically wound wires and with or without a braided exterior reinforcement 18, the invention is not limited to the use of but one intermediate helically wound reinforcing layer, such as 16. On the contrary, additional helically wound reinforcing layers may be provided where greater strength is required than that provided by the structure shown in FIG. 1. Thus, as shown in FIG. 5, three such intermediate helically wound reinforcements are provided.

The embodiment, illustrated in FIG. 5, in which parts equivalent to those in FIG. 1 are identified by the same reference numerals but with a prime attached, comprises an inner liner tube 11' of elastomeric material surrounded by a first reinforcing layer 12' formed by a helically wound layer of metal wires 13' interlaced by textile yarns 14' in the same manner that layer 12 is formed in FIG. 1. Surrounding the layer 12', is insulating or separating layer 15' of elastomer and disposed thereabout is a helically wound reinforcing layer 16' of metal wire formed in the same manner as the layer 16 of FIG. 1.

Over the layer 16' is an insulating layer 17' of elastomer which in turn is surrounded by a reinforcing layer 20 of helically wound metal wires formed in the same manner as the layer 16' but with the wires wound in the opposite direction. The reinforcing layer 20 is covered by an insulating layer 21 of elastomer over which is provided a further reinforcing layer 22 of metal wires helically wound in the reverse direction to those in layer 20 and in the same direction as those in layer 16'. The layer 22 is covered with an insulating layer 23 of elastomer over which is disposed a layer of braided metal wires 18' constructed in the manner previously described for the layer 18 of FIG. 1. The hose construction is completed by the addition of an elastomer cover 19' and the assembly is then vulcanized whereupon it may be used in the manner which will now be readily apparent.

The term wire is used in the description and claims to designate a monofilament of metal. Preferably, the wires employed in the layers which are helically wound, including that which is interlaced with textile yarns, are formed of cold drawn carbon steel having a tensile strength in the range of 300,000 to 400,000 p.s.i. and a diameter in the range of 0.12 to 0.20 inch. The wires in the several helically wound layers may all be of the same size or the wires in different layers may be of different sizes. Preferably, the wires are provided with a surface treatment to improve adhesion to elastomer. In addition to the liquor finish, heretofore mentioned, the wires may be grass plated or provided with other known elastomer-adhesion facilitating finish. The wires employed in the braided layer 18 or 18' may be the same as those in the helically wound layers or may be of different size and/or formed of a metal other than steel, as, for example, when a layer of high electrical conductivity is desired.

The textile yarns which are interlaced with the wires in the radially innermost layer need not be rayon but may be comprised of any of the known textile substances used for reinforcing rubber articles with the size and number of the yarns being selected to provide the requisite tensile strength for the interlacing operation and adequate bulk to protect the liner tube from cutting by the wires. Moreover, although the term yarns is used herein and in the subjoined claims in referring to the textile elements 13 and 13' this term is used in the generic sense and is not limited to elements having any particular number of strands or degree of twist.

It is also to be understood that the term elastomer is used in the description and claims, unless otherwise expressly limited, to include all known rubbery compositions both natural and synthetic and blends thereof capable of being employed in hose manufacture.

Having thus described the invention, we claim:

1. A flexible hose comprising an inner elastomeric tube, a first reinforcing layer in contact with and surrounding said tube, the said layer comprising a single thickness of helically wound wires interlaced by textile yarns helically wound in a reverse direction to said wires in a manner such that the wires lie in a smooth cylindrical configuration and all crimps resulting from the interlacing are entirely in the textile yarns, an insulating layer of elastomer on the radially outer surface of the first reinforcing layer, at least one additional reinforcing layer consisting only of wires wound helically upon the radially outer surface of said insulating layer and in reverse direction to the direction of winding of the wires in the first reinforcing layer, and an external cover.

2. A flexible hose as defined in claim 1 further comprising an insulating layer of elastomer on the radially outer surface of the said additional reinforcing layer, and a braided layer of wires between the radially outer surface of the last-mentioned insulating layer and the said cover.

3. A flexible hose as defined in claim 1 further comprising at least a pair of reinforcing layers each consisting only of wires wound helically about the said additional reinforcing layer, and an insulating layer of elastomer between each of said pair of layers and between the latter and the said additional layer.

4. A flexible hose as defined in claim 1 further comprising an insulating layer of elastomer on the radially outer surface of the said additional reinforcing layer, a third reinforcing layer of wires wound helically upon the radially outer surface of the last-mentioned insulating layer, an insulating layer of elastomer on the radially outer surface of the third reinforcing layer, and a fourth reinforcing layer of wire wound helically upon the radially outer surface of the insulating layer over the third reinforcing layer, the direction of winding of the wires in the said third reinforcing layer being reversed relative to the direction of winding of the wires of second and fourth reinforcing layers.

5. A flexible hose as defined in claim 4 and further comprising an insulating layer of elastomer on the radially outer surface of the said fourth reinforcing layer, and a layer of braided wires between the radially outer surface of the last-mentioned insulating layer and said cover.

References Cited

UNITED STATES PATENTS

| | | | |
|---|---|---|---|
| 222,770 | 12/1879 | Callahan | 138—127 |
| 417,796 | 12/1889 | Taft | 138—127 |
| 1,775,334 | 9/1930 | Wanamaker | 138—125 |
| 2,033,559 | 3/1936 | Warr | 138—130 |
| 2,128,814 | 8/1938 | Gish | 138—125 |
| 2,829,671 | 4/1958 | Ernst et al. | 138—127 X |
| 1,736,106 | 11/1929 | Williamson | 138—127 |

FOREIGN PATENTS

| | | |
|---|---|---|
| 1,157,862 | 11/1963 | Germany. |
| 856,728 | 12/1960 | Great Britain. |

LAVERNE D. GEIGER, Primary Examiner

E. J. EARLS, Assistant Examiner

U.S. Cl. X.R.

138—130, 133

PO-1050
(5/69)

UNITED STATES PATENT OFFICE
CERTIFICATE OF CORRECTION

Patent No. 3,481,368          Dated December 2, 1969

Inventor(s) Robert H. Vansickle, Oren R. Linger and James A. Janshego

It is certified that error appears in the above-identified patent and that said Letters Patent are hereby corrected as shown below:

Column 1, line 59, "couress" should read ---courses---.
Column 2, line 56, "same" has been omitted before "manner".
Column 4, line 23, "0.12 to 0.20" should read ---.012 to .020---.
Column 6, line 9, "Jr." has been omitted after "Williamson".

SIGNED AND
SEALED
MAR 10 1970

(SEAL)
Attest:

Edward M. Fletcher, Jr.
Attesting Officer

WILLIAM E. SCHUYLER, JR.
Commissioner of Patents